US011926971B2

(12) United States Patent
Brown

(10) Patent No.: US 11,926,971 B2
(45) Date of Patent: Mar. 12, 2024

(54) METHOD FOR MANUFACTURING AN ARTIFICIAL TURF SYSTEM AND SUCH A SYSTEM

(71) Applicants: APT Advanced Polymer Technology Corp., Harmony, PA (US); Polytex Sportbelage Produktions-GmbH, Grefrath (DE)

(72) Inventor: Kris Brown, Dalton, GA (US)

(73) Assignees: APT Advanced Polymer Technology Corp., Harmony, PA (US); Polytex Sportbeläge Produktions-GmbH, Grefrath (DE)

( * ) Notice: Subject to any disclaimer, the term of this patent is extended or adjusted under 35 U.S.C. 154(b) by 0 days.

(21) Appl. No.: 16/767,980

(22) PCT Filed: Dec. 7, 2018

(86) PCT No.: PCT/EP2018/083938
§ 371 (c)(1),
(2) Date: May 28, 2020

(87) PCT Pub. No.: WO2019/110783
PCT Pub. Date: Jun. 13, 2019

(65) Prior Publication Data
US 2021/0189663 A1  Jun. 24, 2021

Related U.S. Application Data

(60) Provisional application No. 62/595,775, filed on Dec. 7, 2017.

(30) Foreign Application Priority Data

Mar. 9, 2018 (EP) ..................................... 18161110

(51) Int. Cl.
*E01C 13/08* (2006.01)
(52) U.S. Cl.
CPC .................................. *E01C 13/083* (2013.01)
(58) Field of Classification Search
CPC .. E01C 13/08; E01C 13/083; E01C 2013/086; D10B 2505/202
See application file for complete search history.

(56) References Cited

U.S. PATENT DOCUMENTS 5,902,414 A * 5/1999 Keal ..................... E01H 1/0809
15/348
9,045,071 B2 * 6/2015 Nicholls ................. B29B 17/02
(Continued)

FOREIGN PATENT DOCUMENTS

DE   3313329 A1   10/1984
EP   2206833 A1   7/2010
(Continued)

OTHER PUBLICATIONS

Machine Translation NL 1039532; Apr. 11, 2012 (Year: 2012).*
(Continued)

*Primary Examiner* — Benjamin F Fiorello
(74) *Attorney, Agent, or Firm* — Harness, Dickey & Pierce, P.L.C.

(57) ABSTRACT

A method for manufacturing an artificial turf system provides for collecting infill from an existing artificial turf, wherein the collected infill comprises collected rubber granulates, mixing the collected rubber granulates and a binding agent for generating an elastic binding composition, applying the elastic binding composition over a base layer or over an optional existing artificial turf on top of the base layer, and applying a new artificial turf over the elastic binding composition, and the artificial turf system generated therein.

16 Claims, 11 Drawing Sheets

(56) References Cited

U.S. PATENT DOCUMENTS

| | | | | |
|---|---|---|---|---|
| 9,491,897 | B2* | 11/2016 | Owegeser | E01C 23/121 |
| 9,938,104 | B2* | 4/2018 | Motz | E01C 19/522 |
| 2002/0048676 | A1* | 4/2002 | McDaniel | E01C 13/08 |
| | | | | 428/407 |
| 2004/0234719 | A1* | 11/2004 | Jones | E01C 13/08 |
| | | | | 156/304.4 |
| 2007/0166508 | A1* | 7/2007 | Waterford | E01C 13/08 |
| | | | | 428/90 |
| 2010/0319510 | A1* | 12/2010 | Bearden | B29B 17/02 |
| | | | | 83/155 |
| 2013/0280445 | A1 | 10/2013 | McAnany et al. | |
| 2015/0308056 | A1* | 10/2015 | Spittle | D06N 7/0063 |
| | | | | 428/17 |
| 2017/0175343 | A1* | 6/2017 | des Garennes | E01C 13/08 |
| 2017/0183830 | A1* | 6/2017 | Lee | C08F 287/00 |
| 2017/0328017 | A1* | 11/2017 | Craven | E01C 13/02 |
| 2021/0040698 | A1* | 2/2021 | Davis, Jr. | E01C 13/08 |

FOREIGN PATENT DOCUMENTS

| | | |
|---|---|---|
| JP | 2010043417 A | 2/2010 |
| JP | 2010070987 A | 4/2010 |
| NL | 1039532 C2 | 3/2015 |

OTHER PUBLICATIONS

International Search Report PCT/ISA/210 for International Application No. PCT/EP2018/083938 dated Jan. 31, 2019.
Written Opinion of the International Searching Authority PCT/ISA/237 for International Application No. PCT/EP2018/083938 dated Jan. 31, 2019.
International Search Report PCT/ISA/210 for International Application No. PCT/EP2018/083938 dated Jun. 18, 2020.
Written Opinion of the International Searching Authority PCT/ISA/237 for International Application No. PCT/EP2018/083938 dated Jun. 18, 2020.

* cited by examiner

METHOD FOR MANUFACTURING AN ARTIFICIAL TURF SYSTEM AND SUCH A SYSTEM

CROSS-REFERENCE TO RELATED APPLICATIONS

This application is a national phase under 35 U.S.C. § 371 of PCT International Application No. PCT/EP2018/083938 which has an International filing date of Dec. 7, 2018, which claims priority to European Application No. 18161110.4, filed Mar. 9, 2018 and U.S. Provisional Application No. 62/595,775 filed Dec. 7, 2017, the entire contents of each of which are hereby incorporated by reference.

FIELD OF THE INVENTION

Certain embodiments of the invention relate to the field of artificial turf systems and methods of manufacture. More specifically, certain embodiments of the invention relate to methods of utilizing exiting artificial turfs for manufacturing new artificial turfs, and the systems therefrom.

BACKGROUND OF THE INVENTION

Artificial turf or artificial grass is surface that is made up of fibres which is used to replace grass. The structure of the artificial turf is designed such that the artificial turf has an appearance which resembles grass. Typically, artificial turf is used as a surface for sports such as soccer, American football, rugby, tennis, golf, for playing fields, or exercise fields. Furthermore, artificial turf is frequently used for landscaping applications. An advantage of using artificial turf is that it eliminates the need to care for a grass playing or landscaping surface, like regular mowing, scarifying, fertilizing and watering. For example, watering can be difficult due to regional restrictions for water usage. In other climatic zones the re-growing of grass and re-formation of a closed grass cover is slow compared to the rate of damaging the natural grass surface by playing and/or exercising on the field. Although artificial turf fields do not require similar attention and effort to be maintained, they typically exhibit wear after a usage time of 5-15 years. Mechanical damage from use and exposure to UV radiation, thermal cycling, interactions with chemicals and various environmental conditions generate wear on artificial turf. It is therefore beneficial to efficiently and economically rejuvenate an existing worn artificial turf by manufacturing a new artificial turf reusing one or more components of the existing artificial turf.

US20130280445 A1 describes a system and method for recycling and repurposing a synthetic turf field cover including a pre-existing mixture of rubber and sand particles embedded in the turf material.

BRIEF SUMMARY OF THE INVENTION

Various embodiments provide a method for manufacturing an artificial turf system, an artificial turf system, and a machine for manufacturing an artificial turf system, as described by the subject matter of the independent claims. Advantageous embodiments are described in the dependent claims. Embodiments of the present invention can be freely combined with each other if they are not mutually exclusive.

In one aspect, the invention relates to a method for manufacturing an artificial turf system, comprising, collecting infill from an existing artificial turf, wherein the collected infill comprises collected rubber granulates, mixing the collected rubber granulates and a binding agent for generating an elastic binding composition, applying the elastic binding composition over the existing artificial turf or over a base layer, and applying a new artificial turf over the elastic binding composition.

In another aspect, the invention relates to a an artificial turf system, comprising a base layer and, optionally, an existing artificial turf, a new artificial turf including a plurality of artificial turf fibres and a carrier configured to carry the plurality of artificial turf fibres, and an elastic binding composition layer positioned between the base layer or the optional existing artificial turf and the new artificial turf, wherein the elastic binding composition layer comprises a mixture of infill collected from said or another existing artificial turf and a binding agent.

In yet another aspect, the invention relates to a machine, comprising an intake system configured to collect infill from an existing artificial turf, a mixing system configured to mix the collected infill and a binding agent for generating an elastic binding composition, and an application system configured to apply the elastic binding composition over said or another existing artificial turf or over a base layer for preparing said existing artificial turf or the base layer to receive a new artificial turf.

BRIEF DESCRIPTION OF SEVERAL VIEWS OF THE DRAWINGS

The following embodiments of the invention are explained in greater detail, by way of example only, making reference to the drawings in which.

DETAILED DESCRIPTION OF THE INVENTION

Embodiments of the invention may have the advantage that existing, worn-out artificial turf can be re-used, at least partially, for providing a new artificial turf. Thus, the amount of waste generated upon replacing worn-out artificial turf by a new one may be reduced. Furthermore, costs of the new artificial turf may be reduced, because no or less rubber granules need to be bought for providing a flooring with a defined minimum elasticity. This is because the infill of the existing, worn-out turf is reused for generating an elastic layer that is used as basis for the new artificial turf. Moreover, the elastic binding composition layer may have the advantage that the elastic binding composition (EBC) layer may homogeneously distribute mechanical forces imposed e.g. by a ball or by players of a soccer or rugby game. Thus, the rigidity of the EBC layer may ensure that the players are tiring less quickly.

In contrast to the artificial turf structure described in US20130280445 A1, the infill of the old turf is not recycled for use as infill of the new artificial turf, but rather for mixing the infill and optional further components such as sand and additional new infill granules with a binder to form an elastic layer (EBC layer) to be uses as basis for the new artificial turf. This may greatly increase flexibility, because the infill of the old turf may have a different color or grain size than the color or grain size desired for the new artificial turf. Moreover, as the old infill is used for providing the EBC layer, the new artificial turf may be thinner and thus cheaper than usual without reducing the elasticity of the whole system.

A "pile height" as used herein is the height of artificial turf fibers measured from the top surface of the backing to the top of the artificial turf.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
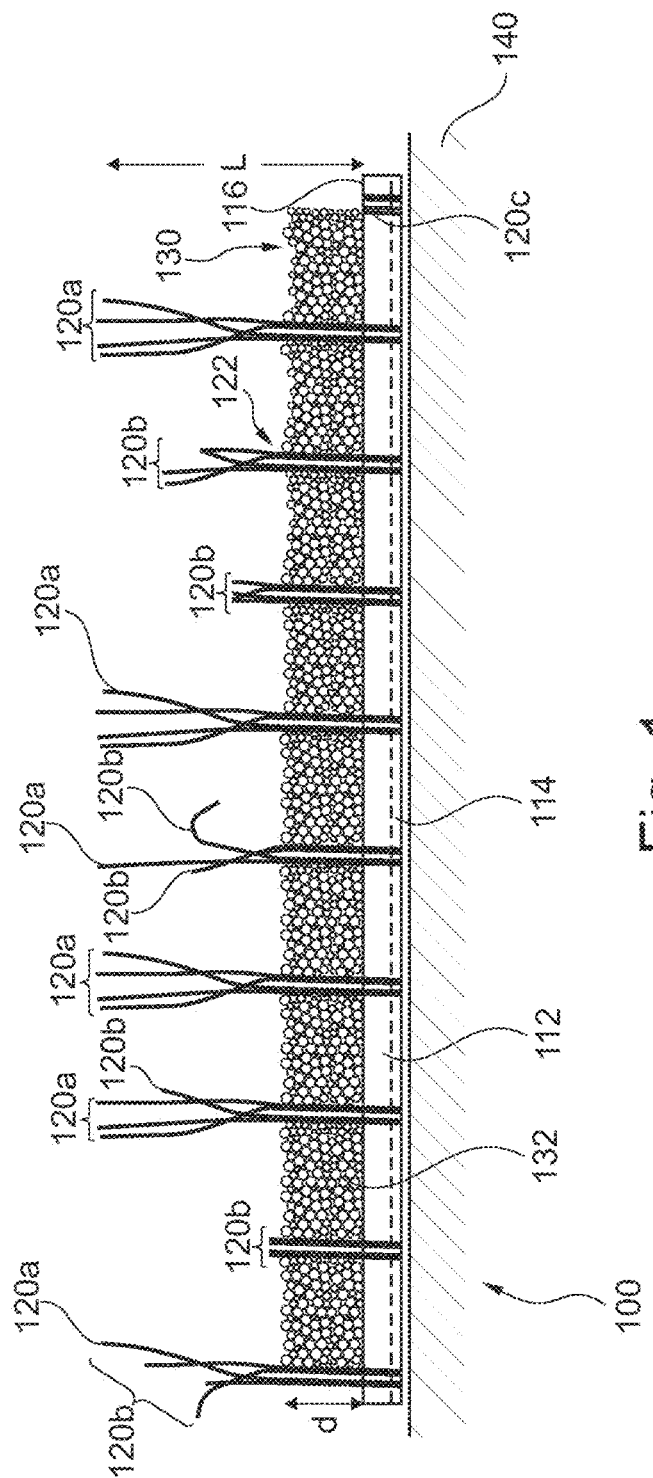
FIG. 1 shows a cross-section of existing artificial turf, according to the prior art.

FIG. 1 shows a cross-section of existing artificial turf 100, according to the prior art. The existing artificial turf 100 comprises artificial turf that has been previously used and/or exposed to the natural elements. The existing artificial turf 100 comprises a carrier layer 112, e.g. a carrier mesh, and a backing 114, e.g. a latex backing or polyurethane backing, positioned on a bottom side of the carrier layer 112, where the bottom side faces towards the earth. The existing artificial turf 100 also includes existing artificial turf fibers 120 that have been tufted into the carrier layer 112 as known in the art. The backing 114 may serve to mechanically bind the artificial turf fibers 120. Various types of glues, coatings or adhesives could be used for the coating layer 114. The backing 114 may be optional. For example, the artificial turf fibers 120 may be alternatively woven into the carrier layer 112 of the artificial turf.

The artificial turf fibers 120 of the existing artificial turf 100 may comprise any combination of intact fibers 120*a*, shown as extending a distance L above a top surface 116 of the carrier layer, partially intact fibers 120*b* comprising fibers that have been broken or damaged in some manner, and which do not extend the distance L above the top surface 116 of the carrier layer, and non-intact fibers 120*c*, which do not extend above the top surface 116 of the backing 110.

Furthermore, the existing artificial turf 100 typically includes an infill layer 130 comprising infill 132 that is a loose collection of granulates arranged on the top surface 116 of the backing 110, thereby filling the space between lower portions 122 of the artificial turf fibers 120 to a typical depth d, as in known in the art. Conventionally, the infill 132 is a rubber infill. The infill 132 may be used to enable the artificial turf fibers 120 to stand vertically up and look like a natural grass athletic field, as well as provide cushion for players on the field. Additionally, the infill 132 may emulate the feeling of natural soil and provide a realistic bounce when sports are played on the field.

The existing artificial turf rests 100 on a substrate 140 referred herein as "base layer", which may be soil, cement or any other type of stable platform that offers adequate support for whatever activity the existing artificial turf 100 was designed.

Over time and use, including exposure to the natural elements, such as UV rays, moisture, heat, thermal cycles (i.e., freezing and thawing cycles), impact from particles carried by the wind, etc., the existing artificial turf 100 exhibits signs of wear. For example, and as illustrated to some extent by FIG. 1, some of the artificial turf fibers 120 may break, tear or become punctured, become loose from the carrier layer 112 and/or the optional backing 114, or may be actual displaced or torn out of the existing artificial turf 100. In addition, the components which comprise the artificial turf fibers 120 may break down chemically, resulting in the fibers losing a collective cushioning effect, for example, or losing mechanical properties such as rigidity and flexibility.

Figure 2:
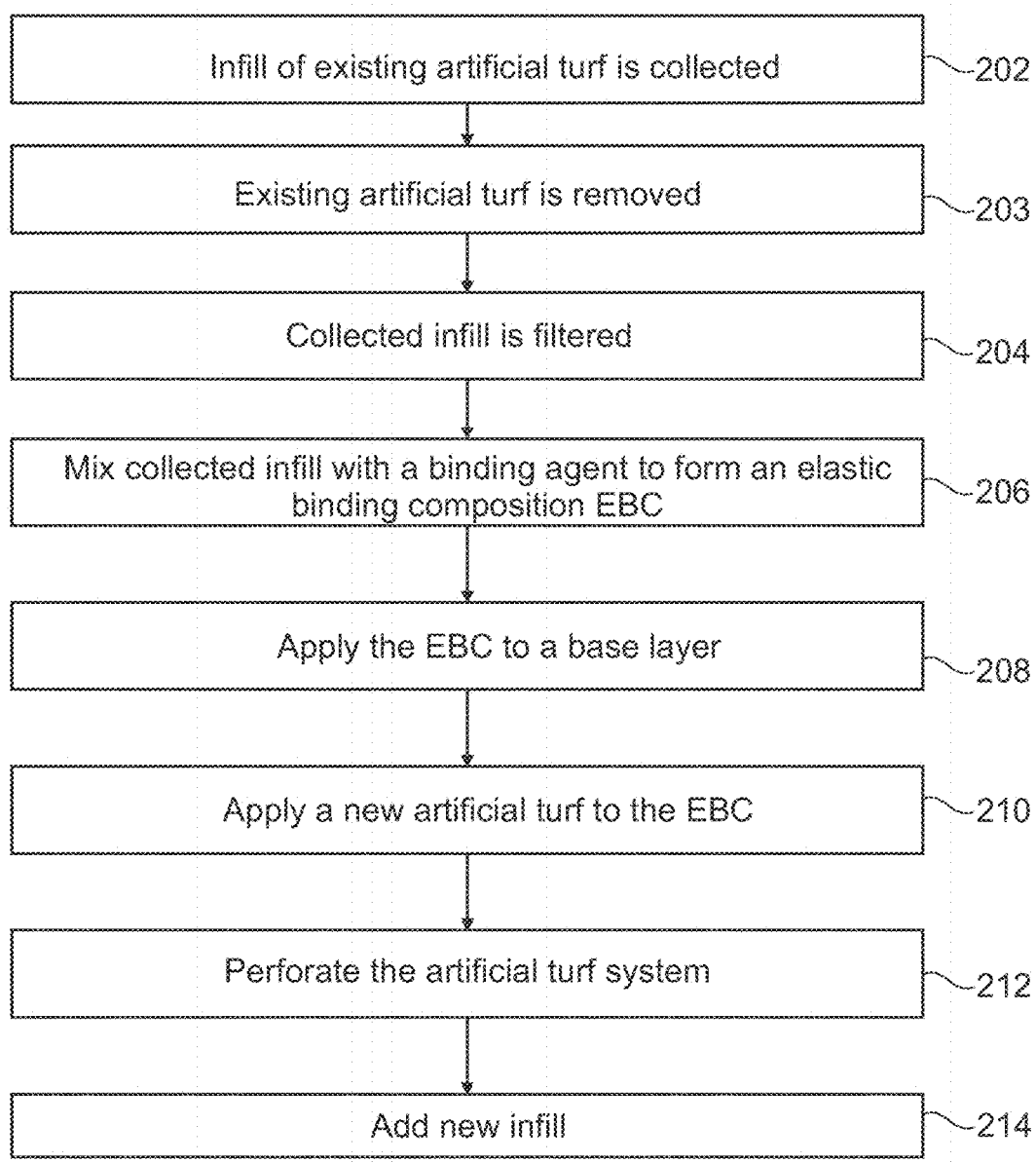
FIG. 2 shows a flowchart of a method of manufacturing an artificial turf system, according to an embodiment of the present invention.
Figure 3:
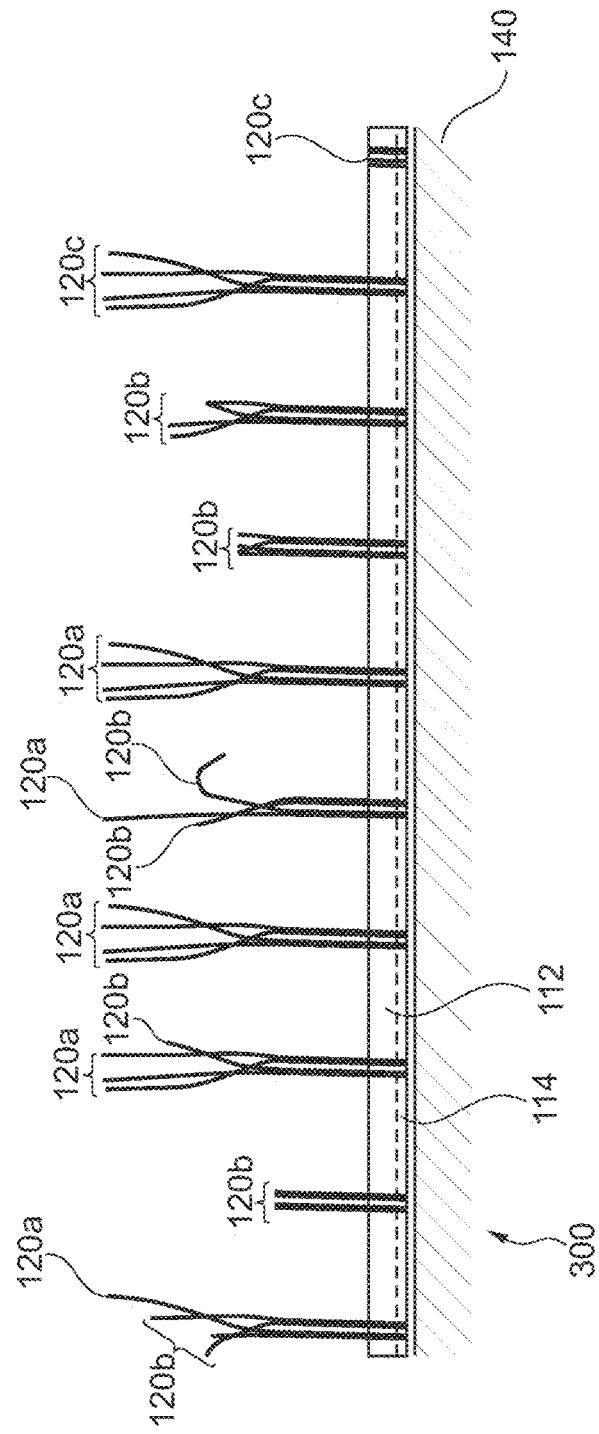
FIG. 3 shows a cross-section of a first prepared existing artificial turf, according to an embodiment of the invention.

FIG. 2 illustrates a method of manufacturing 200 an artificial turf system, according to an embodiment of the present invention. In step 202, infill of an existing artificial turf (i.e., an artificial turf that has been previously installed in the field, and presumably, used) is collected. For example, a collection machine (not shown), such as an industrial vacuum operated by a person, or an automatic, robotic machine configured to collect loose particles or debris with a mechanical or vacuum intake, collects the infill 132 of the existing artificial turf 100, resulting in a first prepared existing artificial turf 300 as illustrated in FIG. 3. FIG. 3 is similar to FIG. 1, having the same reference numbers for the same elements, except that the first prepared existing artificial turf 300 of FIG. 3 does not have the infill 132 as illustrated in FIG. 1. In a further step 203, the existing artificial turf is collected by the same machine that was used for collecting the infill or by a different machine. For example, the existing artificial turf can be rolled up and the rolls of used artificial turf may be transported e.g. to a landfill. Preferably, a single machine performs the collection of the infill and the collection of the rest of the existing artificial turf concurrently.

In one embodiment, the collected infill (not shown) comprises rubber granulates, and in another embodiment, the collected infill comprises rubber granulates and loose pieces of artificial turf fibers 120 and/or loose pieces of the backing 110, or components of the backing 110, that have broken off during the life of the existing artificial turf 100.

In some embodiments, the collected rubber granulates may be styrene butadiene rubber (SBR) granulates, or sulphur-cured ethylene propylene diene monomer rubber (sulphur-cured EPDM) granulates, or a mixture of these granulates. In addition, or alternatively, the collected rubber granules can comprise rubber-coated granulates manufactured from natural fibers, in particular plant fibers such as burlap fibers, jute fibers, cotton fibers, wool fibers, hemp fibers, polyester fibers, natural fibers, flax fibers, kenaf fibers, nettle fibers, sisal fibers, cocos fibers, and combinations thereof. For instance, European Patent EP 2 206 833

A1 discloses a method for producing a particulate infill material for synthetic-grass structures envisages providing a mass of thermoplastic material with a filler consisting of coconut-based material and subjecting said mass of thermoplastic material with the filler consisting of coconut-based material to granulation so as to obtain the aforesaid particulate infill material. Preferentially, the thermoplastic material is in particulate form, and the coconut-based material is in particulate form (fibrous, ground and/or shredded). The mixture obtained by mixing the thermoplastic material and the coconut-based material is preferentially heated in order to bring about softening of the thermoplastic material with the corresponding formation of a matrix of thermoplastic material that incorporates the coconut-based material as filler. However, the scope of the present invention covers collected rubber granulates having all known compositions and mixtures of rubber that could be used in existing artificial turf systems.

In an optional step 204, the collected infill may be filtered by the collection machine, or by another machine or device, referred to as a filter machine or filter apparatus, configured to filter loose particulate, for example, to obtain a filtered collected infill (not shown) comprising substantially of the collected rubber granulates. Additionally, the collection machine may be configured to additionally process the collected rubber granulates by, for example, reducing the size of and/or shaping the collected rubber granulates into spherically-shaped collected rubber granulates having diameters of 0.5-2.5 mm.

In step 206, the collected infill, unfiltered in one embodiment and filtered in another embodiment, is mixed with a binding agent for generating an elastic binding composition, EBC.

In some embodiments, the collected infill and the binder is mixed with sand. In addition, or alternatively, the old, removed artificial turf is processed and mechanically and/or chemically disintegrated. For example, the collected existing artificial turf can be chopped, disrupted, cut, or the like. Thereby, fragments of the fibers of the collected artificial grass are generated. In addition, or alternatively, fragments of other worn out artificial turf fields derived from other regions can be mixed with the infill and the binder to provide fragments of fibers of used artificial turf. The fragments are mixed with the collected infill, the binder and the sand, if any, to provide the EBC.

In one embodiment, the binding agent is liquid polyurethane, and thus the elastic binding composition may be a polyurethane fluid comprising a suspension of the infill of the old, removed artificial turf, e.g. a suspension of styrene-butadiene granules or of sulphur-cured ethylene propylene diene monomer (EPDM) granules, that solidifies into an elastic layer. In other embodiments, the binding agent may be a mixture of polyols and polyisocyanates that solidify into polyurethane, or any other kind of fluid that is capable of solidifying after a pre-defined setting (or hardening) time into a solid layer or film. In some embodiments, the binding agent is mixed not only with the collected and optionally cleaned infill of the old artificial turf, but also with sand and/or additional rubber granules, e.g. SBR or EPDM granules, and/or with rubber-coated granulates made of plant fibers.

The fluid (i.e., the elastic binding composition) may solidify into a film by a drying process or by a chemical reaction resulting in a solidification of the fluid. Such a chemical reaction can be, for example, a polymerization.

In still another embodiment, the collected infill, unfiltered in one embodiment and filtered in another embodiment, is mixed with one of the above-describe binding agents and sand for generating the elastic binding composition.

In still another embodiment, the collected infill, unfiltered in one embodiment and filtered in another embodiment, is mixed with one of the above-describe binding agents and fragments generated from the removed artificial turf, in particular from fibers of the removed artificial turf, and/or sand for generating the elastic binding composition.

In another embodiment of the invention, the collection machine, either with or without the above-mentioned filtering apparatus, or a separate mixing apparatus or mixing machine, is configured to mix the unfiltered or filtered collected infill with the binding agent, and optional with sand, and optional with fragments of the old, removed artificial turf or with fragments of another worn-out artificial turf for generating the liquid elastic binding composition.

In step 208, the liquid elastic binding composition is applied (e.g., poured) over the base layer from which the existing artificial turf was removed (not shown).

Figure 5:
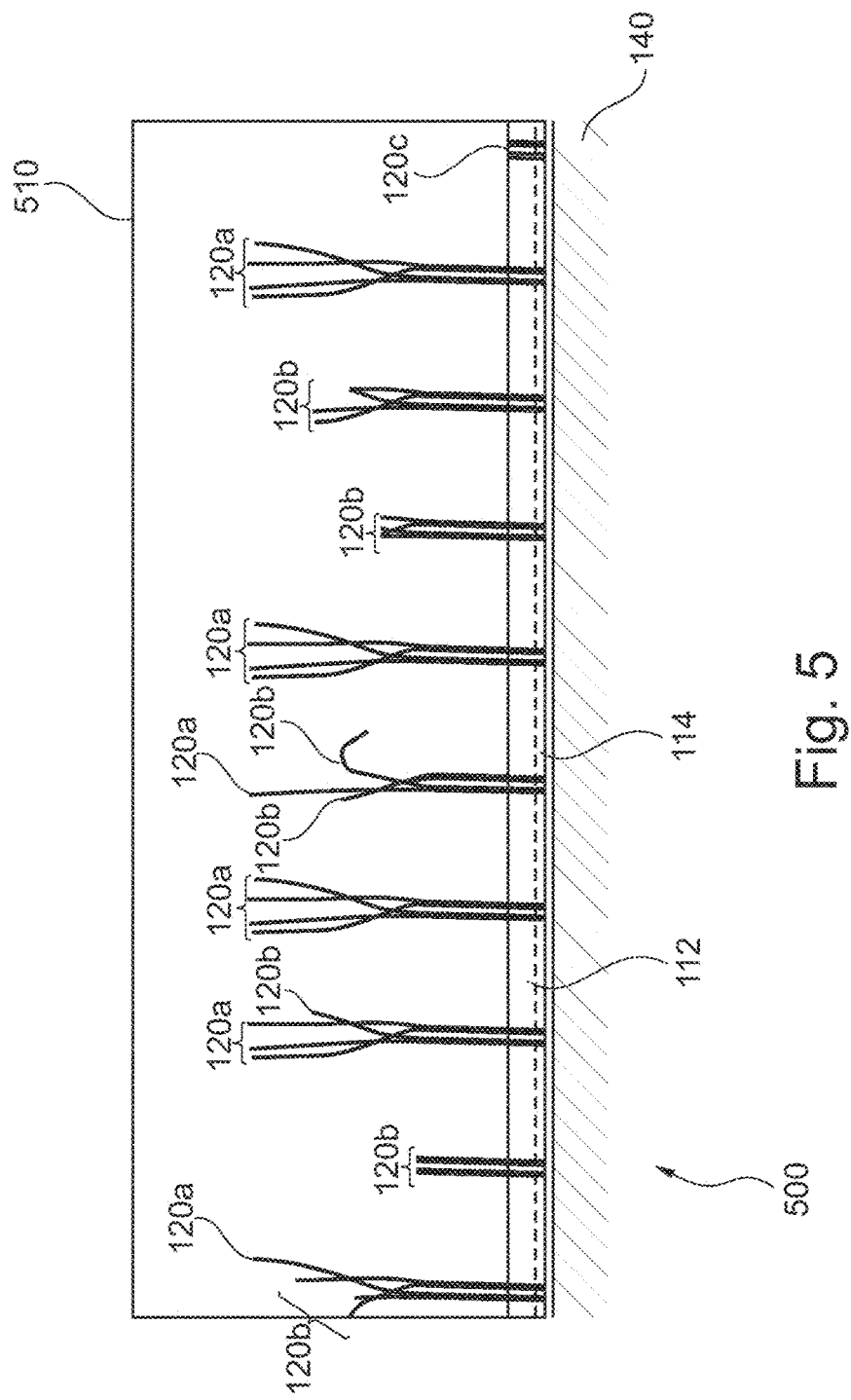
FIG. 5 shows a cross-section of a second prepared existing artificial turf, according to another embodiment of the invention.

In alternative embodiments, step 203 is not performed and the old artificial turf is not removed. In this case, the liquid binding composition is applied on the existing artificial turf, resulting in a second prepared existing artificial turf 500 comprising an elastic binding composition layer 510 as illustrated by FIG. 5. The elements in common between FIG. 5 and FIG. 3 have the same reference numbers.

Figure 4:
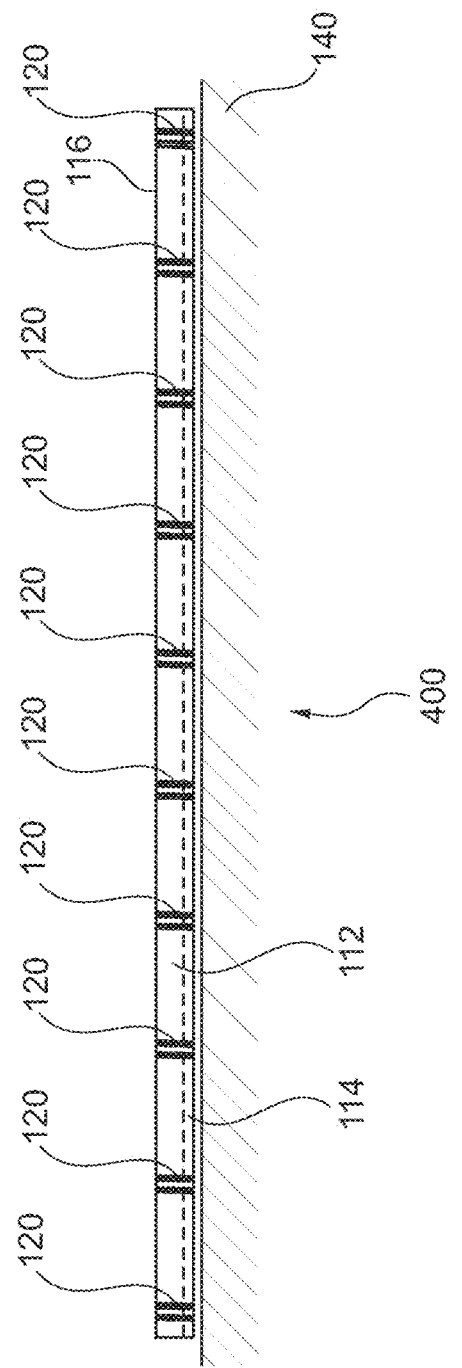
FIG. 4 shows a cross-section of a different first prepared existing artificial turf, according to another embodiment of the invention.

As shown in FIG. 4, in some embodiments, the artificial turf fibers 120 have been cut to be level with the top surface 116 of the artificial turf backing 110. In one embodiment, a cutting machine or the collection machine, either with or without the above-mentioned filtering apparatus, is further configured to cut any existing artificial turf fibers, or portions of artificial turf fibers, extending above the top surface 116 of the backing 110, after the infill is first collected.

Figure 6:
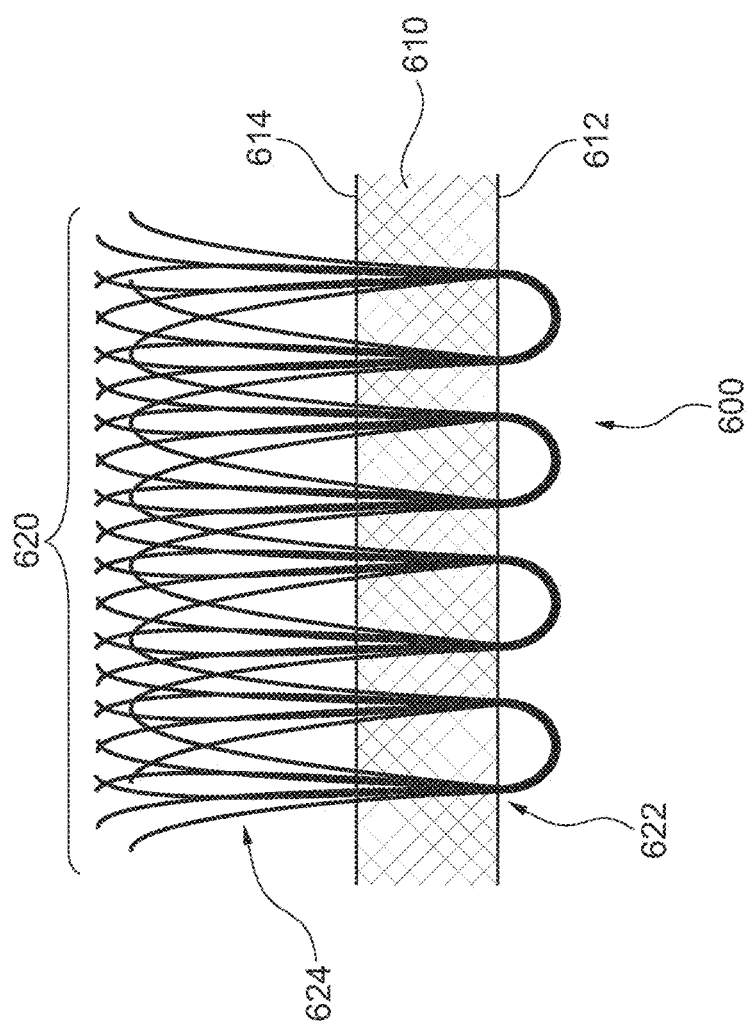
FIG. 6 shows a cross-section of a new artificial turf 600, according to an embodiment of the invention.
Figure 7:
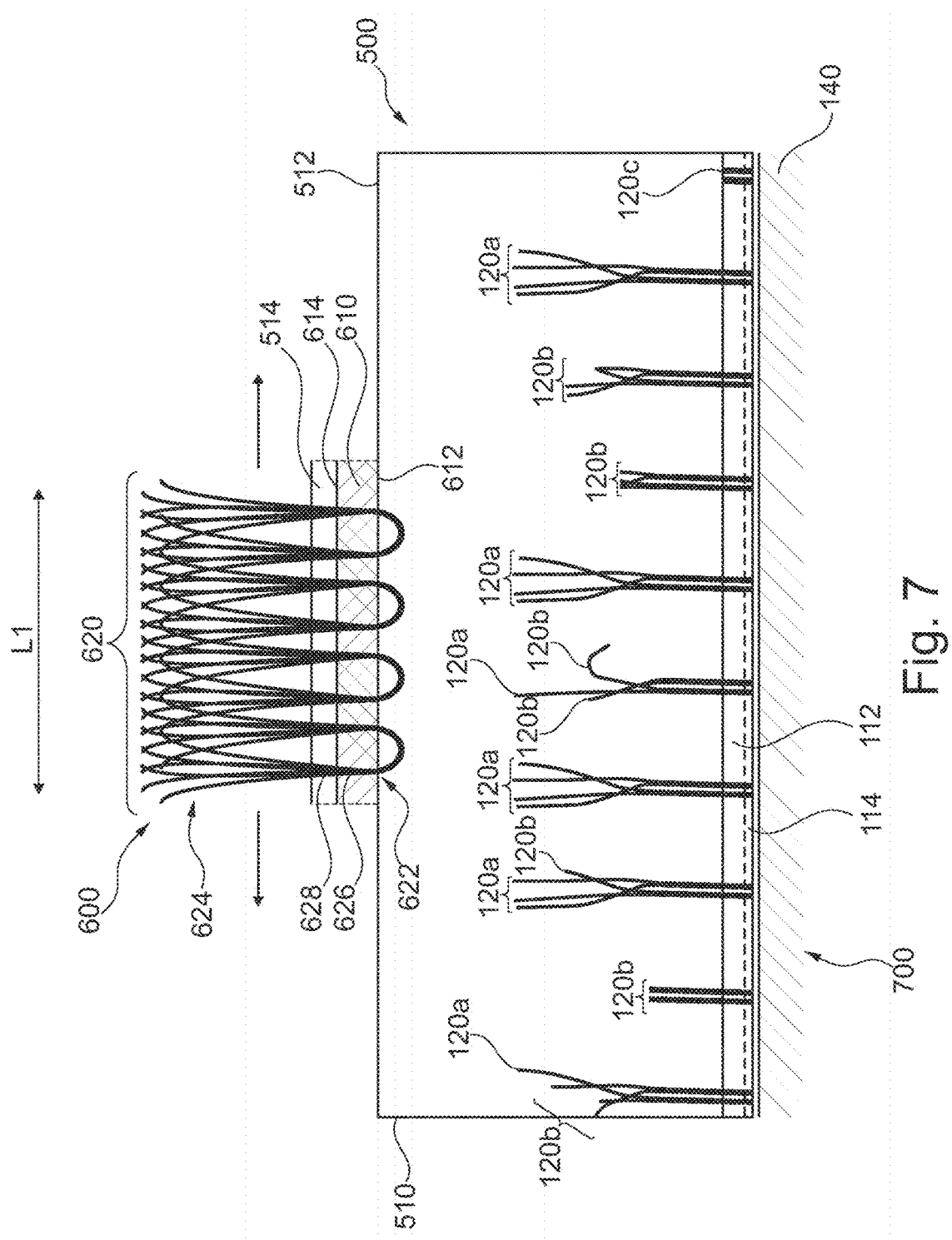
FIG. 7 shows a cross-section of an artificial turf system, according to an embodiment of the present invention.

In step 210, a new artificial turf 600 (see FIG. 6) is applied over the second prepared existing artificial turf 500, resulting in the artificial turf system 700 illustrated in FIG. 7, according to an embodiment of the invention.

According to some embodiments, the new artificial turf is applied on the EBC layer after the EBC layer has solidified. This may have the advantage that the application of the new artificial turf is facilitated as the machine or person applying the new artificial turf can move over the hardened EBC layer.

According to some other embodiments, the new artificial turf is applied on the EBC layer before the EBC layer has solidified. This may have the advantage that the lower side of the new artificial turf gets in contact with the not-yet solidified EBC and the EBC may penetrate the backing and the carrier structure of the new artificial turf. Thus, the liquid EBC may incorporate portions of the new artificial turf and thus firmly fix the new artificial turf upon hardening.

According to preferred embodiments, the old, existing artificial turf is removed completely after the infill of the existing artificial turf was collected. In this case, the elastic binding composition is applied directly on the base layer.

FIG. 6 illustrates an exemplary embodiment of a section of new artificial turf 600. New artificial turf 600 comprises a carrier mesh 610 and new artificial turf fibers 620. In one embodiment, the new artificial turf fibers 620 are arranged in the carrier mesh 610, e.g. a textile plane, by means of tufting. Tufting is a type of textile weaving in which an artificial turf fiber (that may be a monofilament or a bundle of multiple monofilaments) is inserted on a carrier mesh. After the inserting is done, as depicted in FIG. 6, first parts 622 of the artificial turf fibers 620 are exposed to a bottom side 612 of the carrier mesh 610 and second parts 624 of the artificial turf fibers 620 are exposed to a top side 614 of the carrier mesh 610. Preferably, the new artificial turf further comprises a backing (not shown). After its installation, a filler is preferably added to the new artificial turf and the new, completely installed artificial turf comprises a fill layer (not shown).

The artificial turf system 700 illustrated in FIG. 7 is not necessarily drawn to scale, and in addition, for ease of illustration, only a short length L1 of the new artificial turf 600 is illustrated, however the new artificial turf 600 extends in the directions of both of the arrows to completely cover the elastic binding composition layer 510.

In further embodiments of the invention, a person lays, or a machine is configured to lay, the new artificial turf 600 over the second prepared existing artificial turf 500, or more specifically, over a top surface 512 of the elastic binding composition layer 510 of the second prepared existing artificial turf 500. In preferred embodiments, a person lays, or a machine is configured to lay, the new artificial turf 600 over the base layer from which the old, artificial turf was removed after the old infill was collected, or more specifically, over a top surface of the elastic binding composition layer applied on top of the base layer.

Typically, the new artificial turf is applied after the elastic binding composition layer has hardened completely, but in some embodiments, the new artificial turf is applied before the EBC has hardened. This may increase the stability of the generated flooring, because the liquid EBC may contact and wet the lower side of the new artificial turf and thus mechanically fix the new artificial turf upon hardening. The combination of the fixation of the first parts 622 of the artificial turf fibers 620 in the hardened elastic binding composition and the fixation of middle parts 626 of the artificial turf fibers 620 in the carrier mesh 610 provide for further strong support of the new artificial turf fibers 120 in the artificial turf system 700.

In another embodiment of the invention, the carrier mesh 610 may be a textile mesh or may comprise perforations that allow the fluid at the bottom side 612 of the carrier mesh 610 to flow to the upper side 614 of the carrier mesh 610, thereby creating a portion 514 of the elastic binding composition on top of the carrier mesh 610, as illustrated in FIG. 7. In this embodiment, the carrier mesh 610 and parts 626 of the fibers 120 inserted in the carrier mesh 610, as well as some portions 628 of the second parts 624 of the fibers 120, may become embedded and thus fixed in the hardened elastic binding composition.

In an optional step 212, perforations (see 810, FIG. 9) are made to the artificial turf system 700 or any other artificial turf system described herein to allow for drainage of water. In one embodiment, the perforations (not shown in FIG. 7) 810 extend through the optional portion 514 of the elastic binding composition, the carrier mesh 610, and the elastic binding composition layer 510, although the scope of the present invention covers perforations of all depths.

Figure 8:
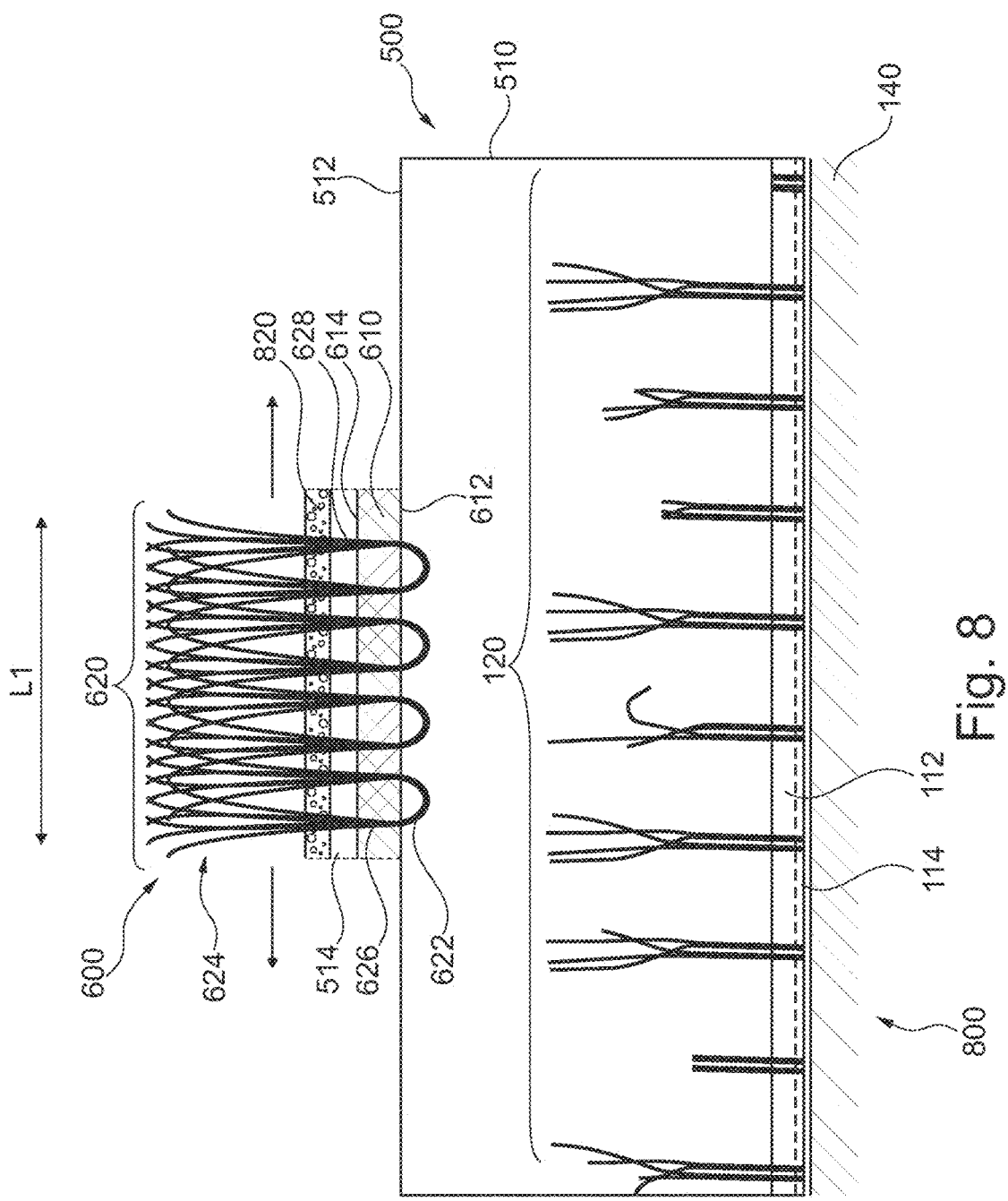
FIG. 8 shows a cross-section of an artificial turf system, according to another embodiment of the present invention.

In step 214, new infill 820 is added to the new artificial turf system 700 of FIG. 7, resulting in the new artificial turf system 800 as illustrated in FIG. 8, according to another embodiment of the invention. FIG. 8 is identical to FIG. 7, with the same reference numbers of identical elements, with the exception of the new infill 820.

Figure 9:
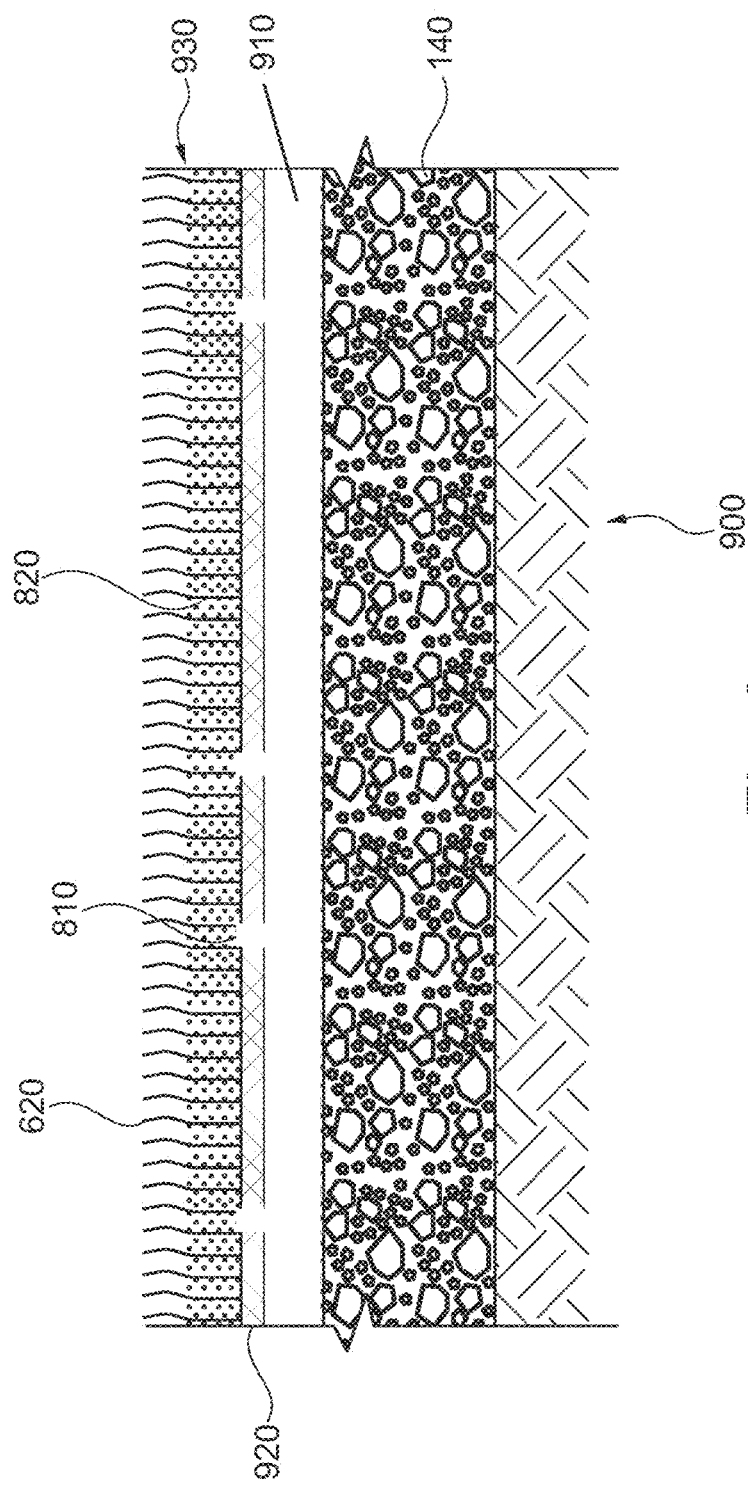
FIG. 9 shows a cross-section of an artificial turf system, according to another embodiment of the invention.

FIG. 9 illustrates a cross-section of an artificial turf system 900, manufactured by a modified version of the method 200 of FIG. 2, according to an embodiment of the invention.

The artificial turf system 900 comprises an existing artificial turf 910, an elastic binding composition layer 920, and a new artificial turf 930. The existing artificial turf 910 may be the first prepared exiting artificial turf 300 illustrated by FIG. 3, or alternatively, the different first prepared existing artificial turf 400 as illustrated by FIG. 4. The existing artificial turf 910 is optional. It may lack the infill, because the infill of the existing artificial turf has been used for generating the elastic layer 920. In some embodiments, the existing artificial turf layer 910 does not exist, because the backing, the carrier and the fibers of the existing artificial turf have been removed before the elastic layer 920 was applied.

The new artificial turf 930 may be the new artificial turf 600 as illustrated by FIG. 6. Furthermore, the elastic binding composition layer 920 may be the elastic binding composition layer 510 as illustrated by FIG. 7 and/or FIG. 8.

As illustrated by FIG. 9, the new artificial turf system 900 may optionally include new infill 820 placed between the new artificial turf fibers 620 and one or more perforations 810 that may extend through the new artificial turf 930 and the elastic binding composition layer 920, or alternatively may extend through the artificial turf system 900 to the substrate 140, upon which the artificial turf system 900 sits.

Figure 10:
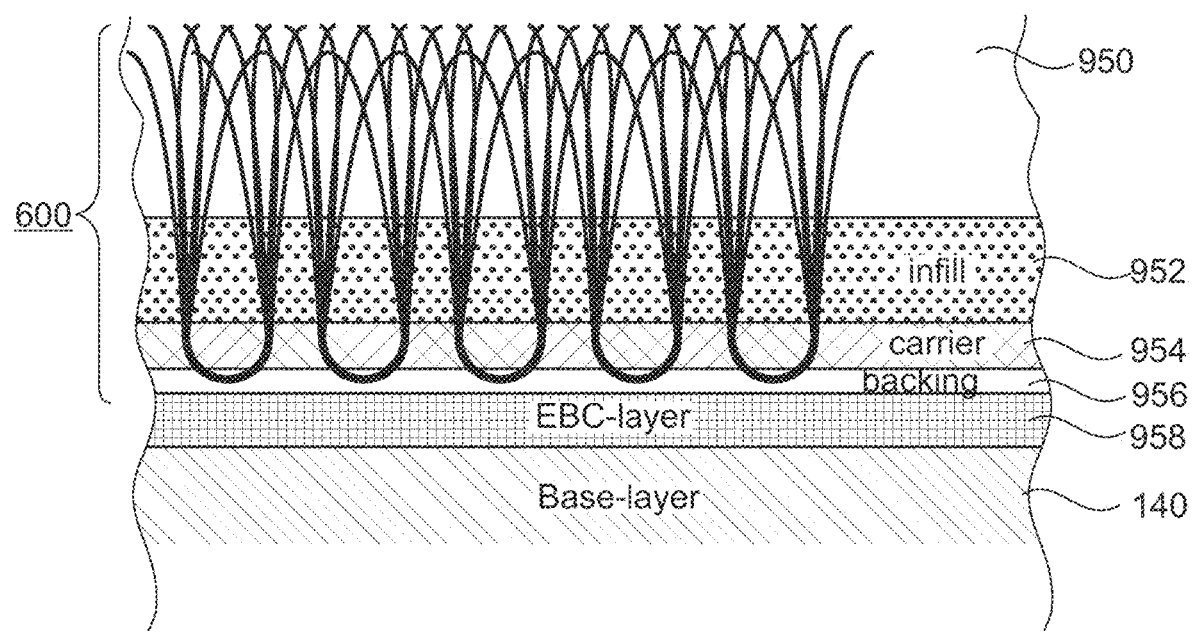
FIG. 10 shows a cross-section of an artificial turf system, according to another embodiment of the invention.

FIG. 10 shows a cross-section of an artificial turf system 950 according to an embodiment of the invention. The artificial turf system 950 comprises new artificial turf 600 that was installed on top of an EBC layer 958. The EBC layer is made from a binder, e.g. a PU binder, that was mixed with infill of an existing (worn-out) artificial turf. For example, the infill can be collected from an existing, worn-out artificial turf that was previously installed on the base layer 140 and that was later removed, e.g. after or while collecting the infill of the existing, old artificial turf. It is also possible that the infill used for generating the EBC-layer was collected from a worn-out artificial turf of a different use site. The new artificial 600 comprises a carrier layer 954, e.g. a carrier mesh, and a backing 956, e.g. a latex backing or polyurethane backing, positioned on a bottom side of the carrier layer 954, where the bottom side faces towards the base layer 140.

The new artificial turf 600 comprises artificial turf fibers that have been tufted or otherwise integrated into the carrier 954 as known in the art. The backing 956 may serve to mechanically bind the artificial turf fibers. Various types of glues, coatings or adhesives could be used for the backing, e.g. latex or PU, and the backing 958 may be optional. Using a backing may be beneficial, as it may increase elasticity of the artificial turf system 950.

Furthermore, the new artificial turf 600 typically includes an infill layer 952 comprising infill that is a loose collection of granulates arranged on the top surface of the backing 958, thereby filling the space between lower portions of the artificial turf fibers to a typical depth, as in known in the art. Conventionally, the infill is a rubber infill. The infill may be used to enable the artificial turf fibers to stand vertically up and look like a natural grass athletic field, as well as provide cushion for players on the field. Additionally, the infill may emulate the feeling of natural soil and provide a realistic bounce when sports are played on the field.

The new artificial turf 600 of the embodiment depicted in FIG. 10 directly rests on the base layer 140, e.g. soil, cement or any other type of stable platform that offers adequate support for whatever activity the new artificial turf 600 was designed.

According to embodiments, the pile height of the new artificial turf 600 is at least 5%, preferably at least 10% lower than the pile height of the removed artificial turf. Preferably, the pile height of the new artificial turf is not more than 50% lower than the pile height of the existing/ removed artificial turf. In other words, the pile height of the new artificial turf is at least 50% of the pile height of the old existing/removed artificial turf. This may be beneficial, because thanks to the EBC-layer, a desired degree of elasticity may be achieved with a comparatively low pile height, and thus, with reduced production costs.

In addition, or alternatively, the height or thickness of the backing of the new artificial turf 600 is at least 5%, preferably at least 10% lower than the height of the backing of the removed artificial turf. This may be beneficial, because thanks to the EBC-layer, a desired degree of elasticity may be achieved with a comparatively low height of the backing, and thus, with reduced production costs. In accordance with embodiments of the invention the thickness of the backing of the new artificial turf is at least 50% of the existing or removed artificial turf.

In addition, or alternatively, the height of the infill of the new artificial turf, if any, is at least 5%, preferably at least 10% lower than the height of the infill of the removed artificial turf. This may be beneficial, because thanks to the EBC-layer, a desired degree of elasticity may be achieved with a comparatively low height of the filling layer, and thus, with reduced production costs. In accordance with embodiments of the invention the infill level of the new artificial turf is at least 50% of the existing or removed artificial turf.

Figure 11:
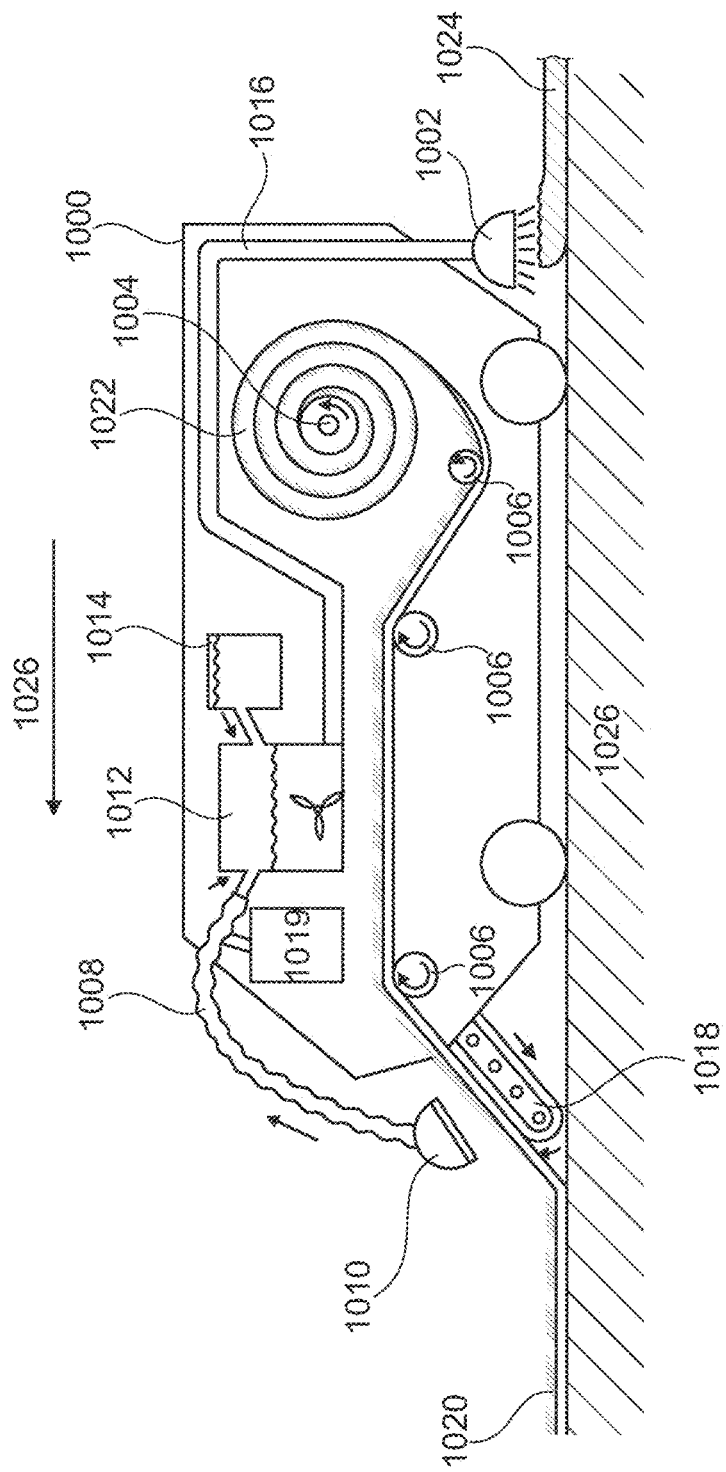
FIG. 11 shows a machine for deconstructing an existing artificial turf and for creating the ECB layer according to an embodiment of the invention.

FIG. 11 shows a machine 1000 for deconstructing an existing, worn-out artificial turf 1020 and for creating an EBC-layer 1024.

The machine may move in the direction indicated by arrow 1026. It comprises a first intake system 1018 having e.g. the form of a plane conveyor belt, that collects the old artificial turf and that is operatively connected to one or more rotating godets 1006 which transport the collected artificial turf and wind it onto a spool or bobbin 1004. Thus, a roll 1022 of worn-out artificial turf is generated that can be transported to a landfill.

The machine 1000 further comprises a second intake system 1010 configured to collect infill from an existing artificial turf. For example, the second intake system can be an aspirator that sucks the infill particles, e.g. rubber granules, from the worn-out artificial turf while it is collected by the first intake system 1018. An example of an infill intake system is described e.g. in US20130280445 A1.

The aspirated infill particles are transported via a duct 1008 to a container 1012 used for mixing the collected infill with a binder, e.g. a one component or two-component polyurethane reaction mixture. The binder can be stored in a tank 1014 connected to the container 1012 via a duct with a valve that allows a continuous adding of a defined amount if the binder. The container 1012 may comprise a stirrer or a similar device for homogeneously mixing the collected infill, the binder and any additional substances to be included in the mixture that is generated in the container 1012 and that is to be used as the EBC. The container 1012 with the stirrer and the connected one or more tanks 1014 and ducts 1008 provide a mixing system configured to mix the collected infill and the binding agent for generating the elastic binding composition. The binding composition is transported via a further duct 1016 to an application system 1002 configured to apply the elastic binding composition over said a base layer 1026 for preparing said base layer to receive a new artificial turf. For example, the application system 1002 can be a nozzle 1002 that applies and optionally levels the elastic binding composition on the ground.

The vehicle 1000 can optionally comprise a cleaning unit 1019 that cleans the collected infill from debris before the cleaned infill is added to the container 1012.

The invention claimed is:

1. A method for manufacturing an artificial turf system, comprising:
   (a) collecting infill from an existing artificial turf, wherein the collected infill comprises collected rubber granulates;
   (b) mixing the collected rubber granulates and a binding agent for generating a liquid elastic binding composition;
   (c) pouring the liquid elastic binding composition over the existing artificial turf or directly on a stable platform, wherein the stable platform is soil, cement, or a base layer of the existing artificial turf; and
   (d) applying a new artificial turf over the liquid elastic binding composition, wherein
   the elastic binding composition solidifies into an elastic layer.

2. The method of claim 1, wherein said collected rubber granulates are spherically-shaped having diameters of 0.5-2.5 mm.

3. The method of claim 1, wherein the mixing further comprises mixing the collected rubber granulates, the binding agent, and sand for generating the elastic binding composition.

4. The method of claim 1, further comprising:
   disintegrating the existing artificial turf for generating fragments of the fibers of the removed artificial turf; and
   wherein the mixing further comprises mixing the collected rubber granulates, the binding agent and the fragments, for generating the elastic binding composition.

5. The method of claim 1, wherein the collected rubber granulates comprise one of styrene butadiene rubber (SBR) granulates and sulphur-cured ethylene propylene diene monomer rubber (sulphur-cured EPDM) granulates or rubber-coated granulates manufactured from natural fibers, in particular plant fibers such as burlap fibers, jute fibers, cotton fibers, wool fibers, hemp fibers, polyester fibers, natural fibers, flax fibers, kenaf fibers, nettle fibers, sisal fibers, cocos fibers, and combinations thereof.

6. The method of claim 5, wherein the collection of the infill is performed by a machine configured for rolling up the existing artificial turf.

7. The method of claim 1, further comprising removing the existing artificial turf for allowing the application of the elastic binding composition on the base layer.

8. The method of claim 1, wherein the collection of the infill is performed by a machine configured for aspirating or mechanically collecting the infill.

9. The method of claim 1, wherein a pile height of the new artificial turf is at least 5% lower than the pile height of the existing artificial turf.

10. The method of claim 1, wherein a height of the backing of the new artificial turf is at least 5% lower than the height of the backing of the existing artificial turf.

11. The method of claim 1, wherein a height of the infill of the new artificial turf, if any, is at least 5% lower than the height of the infill of the existing artificial turf.

12. The method of claim 1, wherein said generated elastic binding composition has a hardening time, and wherein applying the new artificial turf over the elastic binding composition further comprises applying the new artificial turf over the elastic binding composition before expiration of the hardening time.

13. The method of claim 1, wherein the new artificial turf comprises a plurality of fibers embedded in a carrier mesh having a first side and a second side, wherein each fiber of the plurality of fibers comprises a first part exposed to said first side of said carrier mesh and a second part exposed to said second side of said carrier mesh, and wherein said first side is adjacent to said elastic binding composition.

14. The method of claim 13, wherein said first part of said each fiber is embedded in a polyurethane- or latex backing for mechanically fixing said first part of said each fiber to said backing.

15. The method of claim 1, wherein said generated elastic binding composition has a hardening time, and wherein the method further comprises forming perforations in the new artificial turf and the elastic binding composition after expiration of the hardening time.

16. A machine, comprising:
an intake system configured to collect infill from an existing artificial turf;
a mixing system including a container, the mixing system configured to mix the collected infill and a binding agent in the container for generating a liquid elastic binding composition; and
an application system configured to pour the liquid elastic binding composition over said or another existing artificial turf or directly on a stable platform for preparing said existing artificial turf or said stable platform to receive a new artificial turf, wherein the stable platform is soil, cement, or a base layer of the existing artificial turf.

* * * * *